United States Patent [19]
Van Ert et al.

[11] Patent Number: 5,855,310
[45] Date of Patent: Jan. 5, 1999

[54] REMOVABLE INTERIOR STORAGE CONTAINER FOR MOTOR VEHICLE

[75] Inventors: Jack Michael Van Ert, Rochester Hills; Dan Bernard Malski, Royal Oak, both of Mich.

[73] Assignee: Lear Corporation, Southfield, Mich.

[21] Appl. No.: 801,432

[22] Filed: Feb. 18, 1997

[51] Int. Cl.⁶ .................................................. B60R 11/00
[52] U.S. Cl. .................. 224/543; 224/275; 224/539; 224/547; 296/37.13; 296/37.16
[58] Field of Search .................... 224/543, 547, 224/404, 275, 539; 296/37.15, 37.13, 37.8, 37.16; 220/480, 481, 484, 509, 343; 206/511, 508, 509

[56] References Cited

U.S. PATENT DOCUMENTS

| | | | |
|---|---|---|---|
| 2,578,238 | 12/1951 | Goldman | 206/511 |
| 3,616,943 | 11/1971 | Brink | 206/511 |
| 4,615,464 | 10/1986 | Byrns | 220/343 |
| 4,660,880 | 4/1987 | Bensch | 296/37.1 |
| 4,685,567 | 8/1987 | Webb | 220/343 |
| 4,750,774 | 6/1988 | Pickering | 296/37.13 |
| 4,842,175 | 6/1989 | Towsend | 224/275 |
| 4,878,706 | 11/1989 | Novikov | 296/37.1 |
| 5,072,983 | 12/1991 | Muroi et al. | 296/37.13 |
| 5,316,178 | 5/1994 | Garber, Jr. | 220/481 |
| 5,501,384 | 3/1996 | Wisniewski | 224/539 |
| 5,535,931 | 7/1996 | Barlow et al. | 224/404 |
| 5,588,631 | 12/1996 | Yee | 224/404 |

*Primary Examiner*—Linda J. Sholl
*Attorney, Agent, or Firm*—Brooks & Kushman P.C.

[57] ABSTRACT

A removable storate container for a motor vehicle interior is disclosed. The storage container comprises first and second container halves and a hinge. The first container half has an indentation adapted to engage a projection on a floor of the vehicle. The second container half is disposed adjacent a side wall of the vehicle, and includes at least one hole adapted to removably engage a corresponding projection extending from a side wall of the vehicle. The hinge pivotably connects the first container half and the second container half. Optional features include foam padding disposed between the first container half and the second container half, and a handle connected to the storage container for carrying the storage container when the storage container is removed from the vehicle.

15 Claims, 5 Drawing Sheets

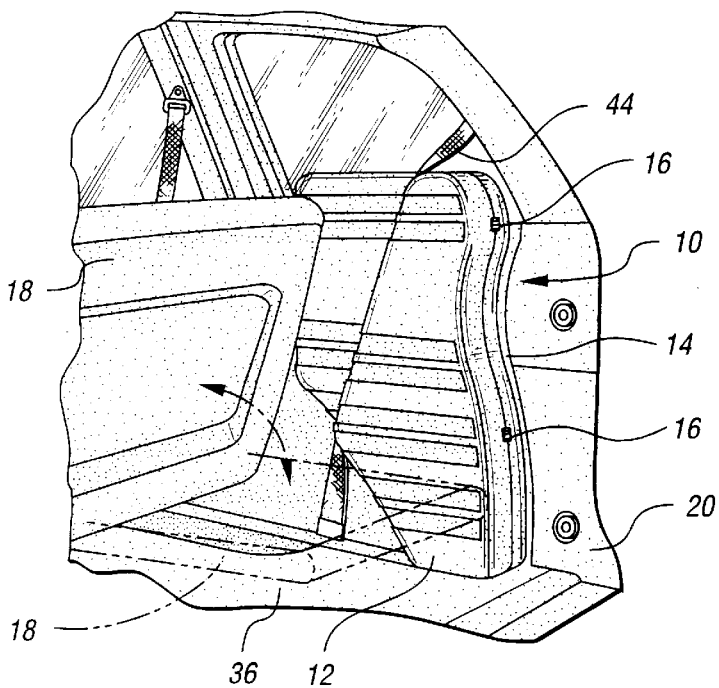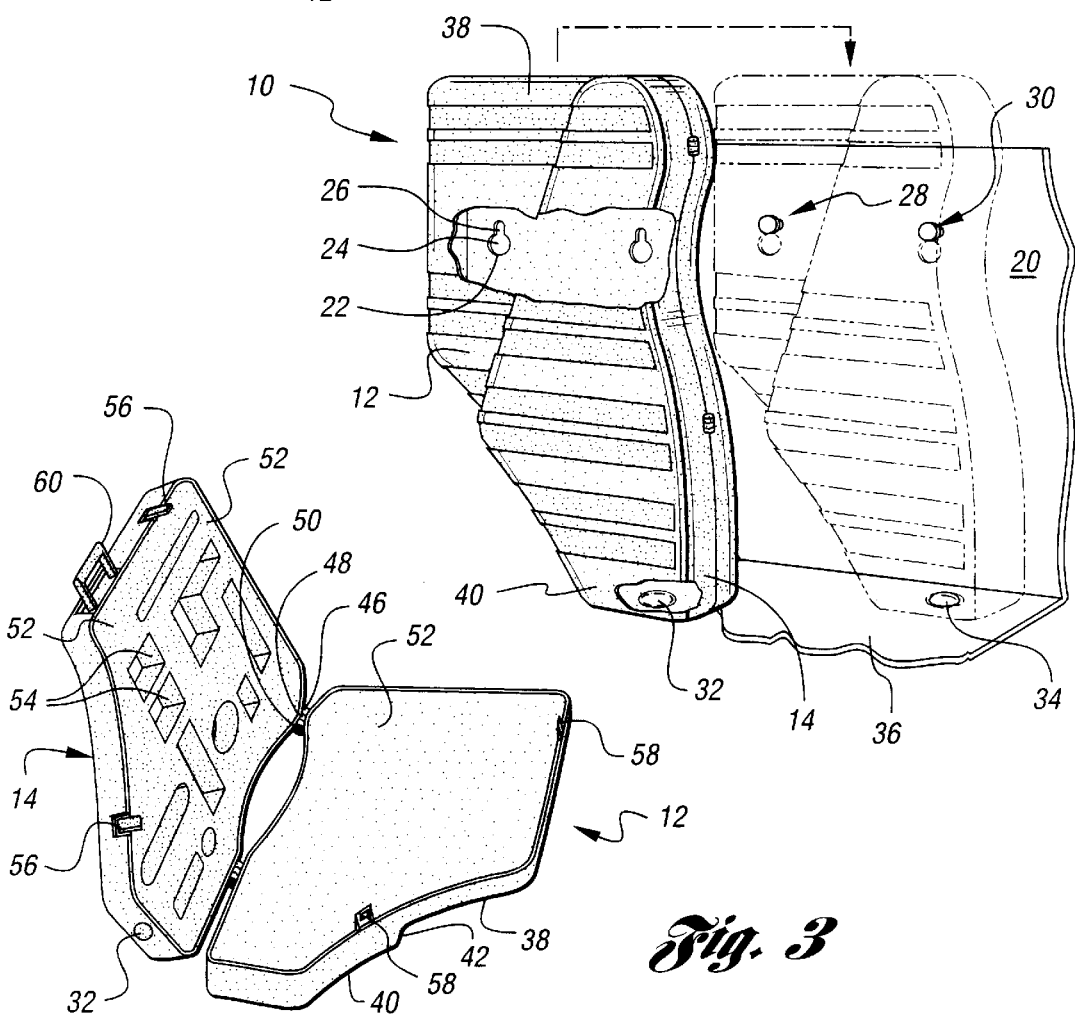

REMOVABLE INTERIOR STORAGE CONTAINER FOR MOTOR VEHICLE

TECHNICAL FIELD

This invention relates to storage containers for motor vehicles, and more particularly to a removable storage container for the interior of a motor vehicle.

BACKGROUND ART

Storage space in a motor vehicle largely consists of the trunk of a car or, in the case of minivans or sport utility vehicles, the rear of the passenger compartment. Storage containers for motor vehicles, pre-assembled for convenience or security, have been proposed. Examples of such storage containers may be seen in U.S. Pat. No. 5,535,931 and U.S. Pat. No. 5,501,384.

When situated behind a seat in the motor vehicle, however, prior art storage containers often interfere with rearward deployment of the seat.

SUMMARY OF THE INVENTION

The present invention is a storage container for a motor vehicle. The storage container comprises first container half and a second container half disposed adjacent a side wall of the vehicle, and a hinge pivotally connecting the container halves. At least one hole is provided in the second container half for removably mounting the storage container to projections extending from a side wall of the vehicle. Finally, a handle connected to the storage container is provided for carrying the storage container when the storage container is removed from the vehicle.

Accordingly, it is an object of the present invention to provide a storage container of the type described above which is efficiently storable in the vehicle.

Another object of the present invention is to provide a storage container of the type described above which does not interfere with the rearward deployment of a rear seat of the vehicle.

These and other objects, features, and advantages of the present invention are readily apparent from the following detailed description of the best mode for carrying out the invention when taken in conjunction with the accompanying drawings.

BRIEF DESCRIPTION OF THE DRAWINGS

FIG. 1 is a perspective view of a storage container according to the present invention in a stowed position in the rear of a motor vehicle;

FIG. 2 is a perspective view showing one method of mounting the storage container in the vehicle;

FIG. 3 is a perspective view of the storage container removed from the interior of the vehicle and in an open position;

BEST MODE FOR CARRYING OUT THE INVENTION

Figure 4:
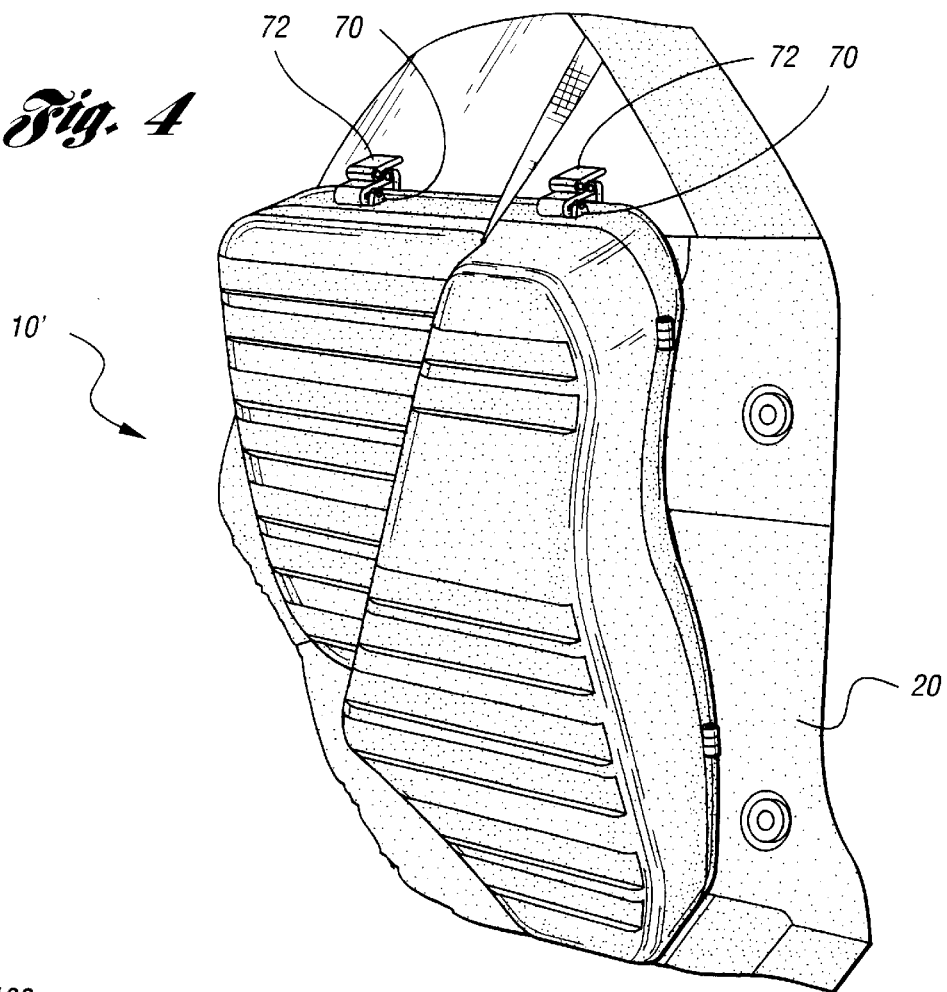
FIG. 4 is a perspective view showing an alternative method of mounting the storage container in the vehicle.

With reference to the drawings, the preferred embodiments of the present invention will be described. FIGS. 1 and 6–12 show a storage cabinet or container 10 according to the present invention for the interior of a motor vehicle. The storage container 10 comprises blow molded or injection molded plastic container halves 12 and 14, preferably formed of polypropylene or polyethylene, and a hinge preferably formed as a pair of hinge elements 16. A pair of the storage containers 10 may be situated, for example, in opposed cavities in the interior rear quarters of a minivan or sport utility vehicle generally rearwardly of a rear seat 18 and adjacent to any rear gate.

In its mounted position, the second container half 14 is disposed adjacent a side wall 20 of the vehicle. As best shown in FIG. 2, a pair of holes 22 are provided in the second container half 14. Each of the holes 22 includes a generally circular portion 24 and a smaller width slot portion 26 extending generally vertically from the circular portion. A pair of projections 28, each including a circular knob 30 having a diameter less than that of the circular portion 24 but greater than the width of the slot 26, extend horizontally from the side wall 20 of the vehicle.

When the storage container is properly aligned and brought adjacent the side wall 20, as shown by the arrow in FIG. 2, the projections 28 extend through the circular portions 24 on the second half 14 of the storage container 10. The storage container 10 can then lowered so that the projections 28 move up into the slot portions 26 and the knobs 30 removably mount the storage container to the vehicle, as shown in phantom in FIG. 2. To facilitate location and retention of the storage container, the first container half 12 is optionally provided with a dimple or indentation 32 adapted to engage a projection 34 on a floor 36 of the vehicle. It should be understood, of course, that the indentation 32 can be formed in either or both of the container halves, and that the storage container need not be designed to rest on the floor of the vehicle at all.

As perhaps best shown in FIG. 3, the first container half 12 includes a relatively thin front portion 38 and a widened back portion 40. The portions 38 and 40, which lie in generally parallel planes, are connected by an intermediate portion 42 which may extend at about a five to ten degree angle to the planes defined by the portions 38 and 40. As alternative or supplemental means of retaining the storage container 10 adjacent the side wall 20 of the vehicle, the storage container can be designed so that an unused seat belt 44, or a dedicated belt provided for the purpose, engages the intermediate portion 42 as shown in FIG. 1.

The hinges 16 pivotally connect the first container half 12 and the second container half 14. Preferably, the hinges 16 comprise mating sections 46 and 48 integrally molded with their respective container half, and a post-applied metal hinge pin 50. Alternatively, conventional small metal hinges can be secured to the container halves. The container halves 12 and 14 preferably have a wall thickness of between about 2 and 3 millimeters, and may be provided with raised ribs on one or more of their exterior surfaces.

The storage container 10 can be left empty for use as storage space by the vehicle user, or provided with any combination of pre-packaged equipment. For instance, a road kit may include such things as a compressor, flashlight, first aid kit, flares, and a fire extinguisher. A tailgating package may include a folding chair, dinner utensils, a grille and a canopy. Other packages, such as one for camping, are also possible. To this end, urethane foam padding 52 is preferably disposed between the first container half 12 and the second container half 14 as shown in FIG. 3, and includes shaped cutouts 54 for receiving equipment in a particular package.

A plurality of latches 56 on either of the container halves engage corresponding latch receivers 58 on the other container half for releasably securing the first and second container halves 12 and 14. Provision may be made, in the latches or separately, for a locking mechanism to secure the contents of the storage container 10. A handle 60, spring-biased to a normally retracted position flush with the periphery of the storage container when not is use, is also provided for carrying the storage container when removed from the vehicle.

FIG. 4 shows an alternative method of mounting the storage container 10' to the side wall 20 of the vehicle. Instead of projections 28 with knobs 30 and corresponding keyholes 22 as shown in FIG. 2, the storage container 10' may be provided with latch receivers 70 for engagement with latches 72 attached to the side wall 20. Alternative or supplemental methods of mounting the storage container to the vehicle include hook and loop fasteners and/or magnets.

Figure 5:
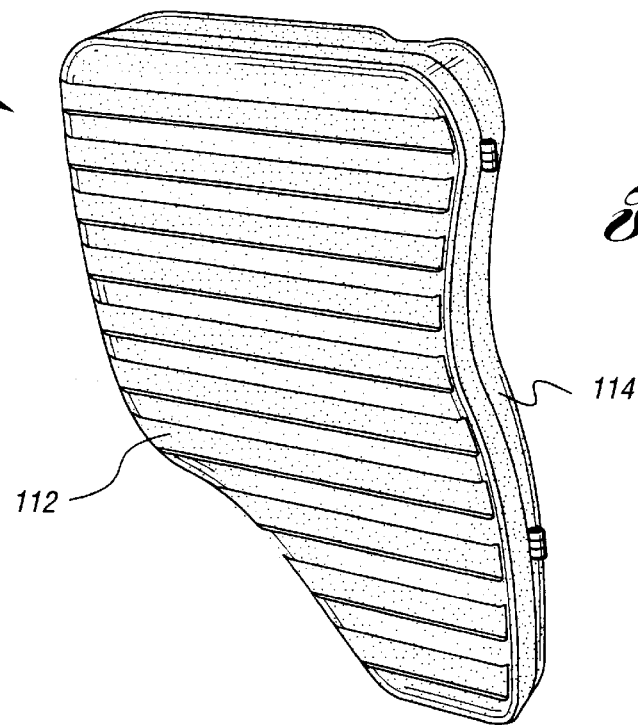
FIG. 5 is a perspective view of an alternative embodiment of the storage container.
Figure 6:
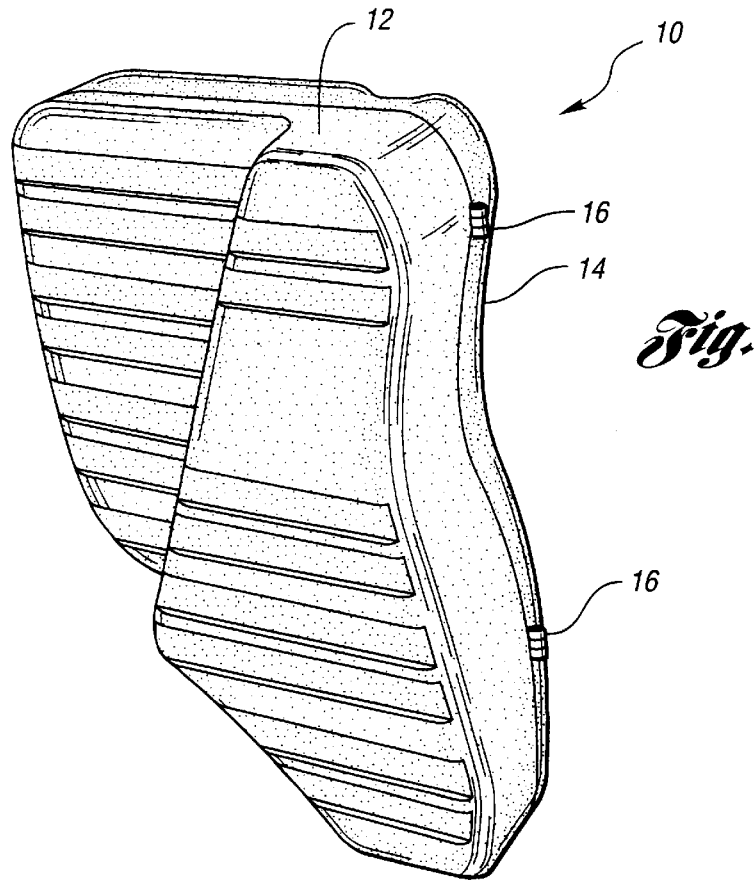
FIG. 6 is a top front perspective view of the storage container.
Figure 7:
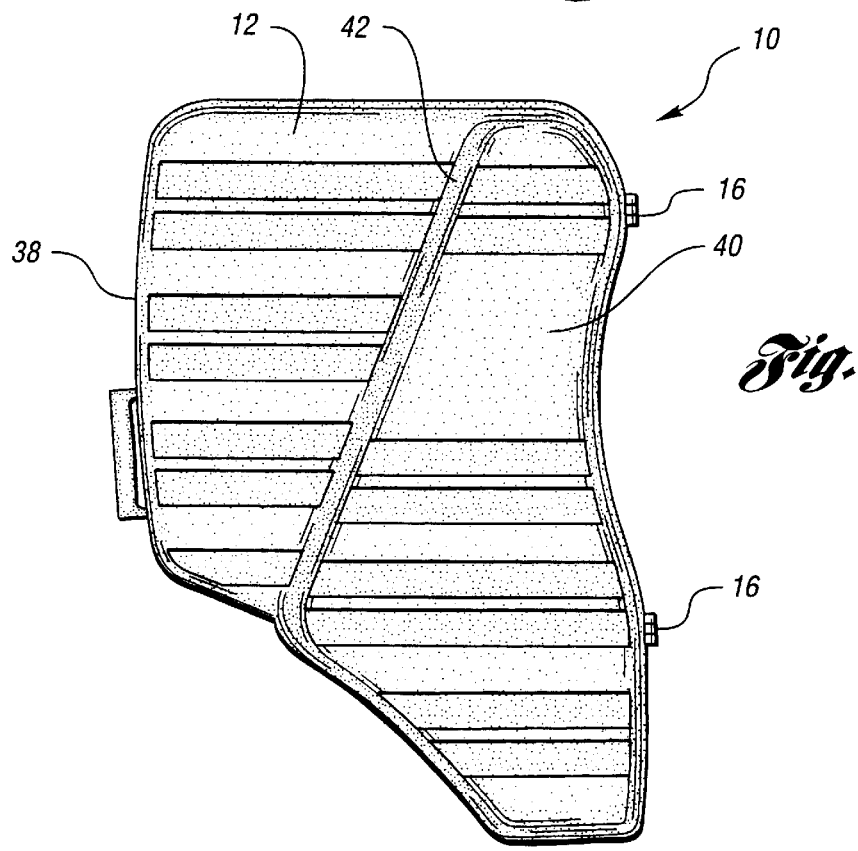
FIG. 7 is a front elevation view of the storage container.
Figure 8:
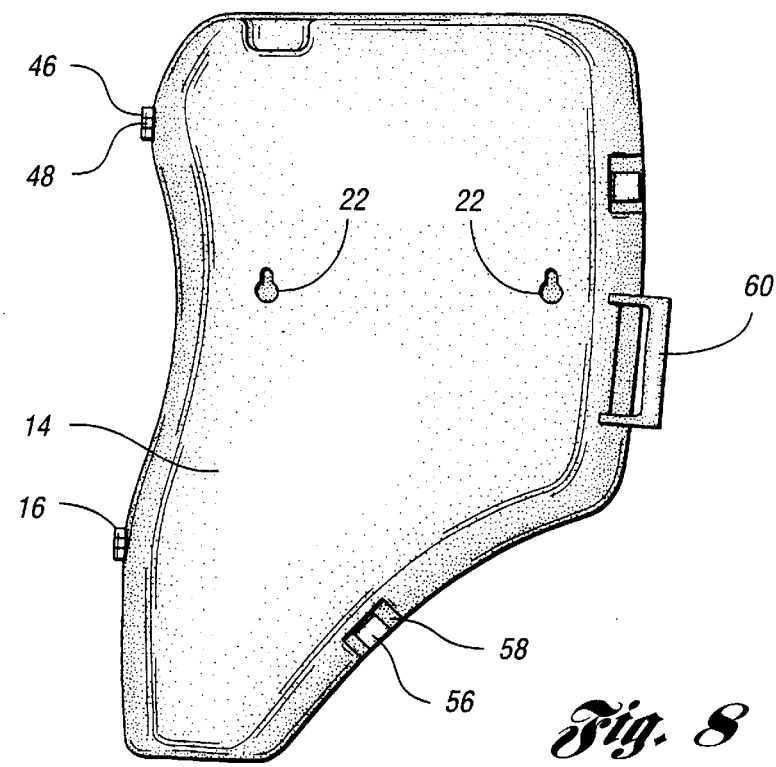
FIG. 8 is a rear elevation view of the storage container.
Figure 9:
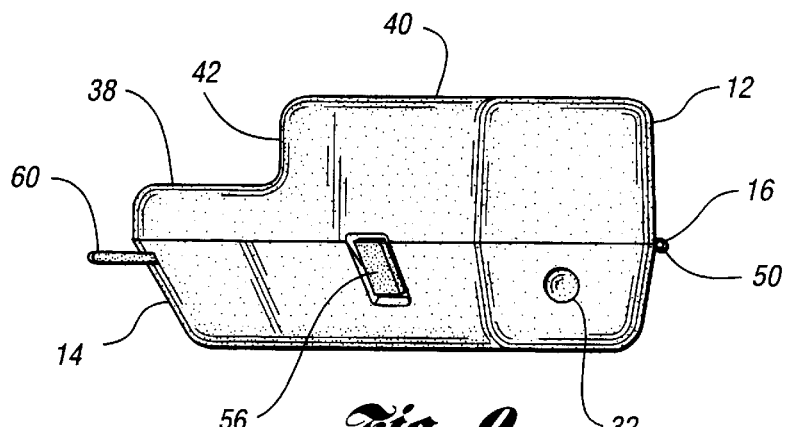
FIG. 9 is a bottom view of the storage container.
Figure 10:
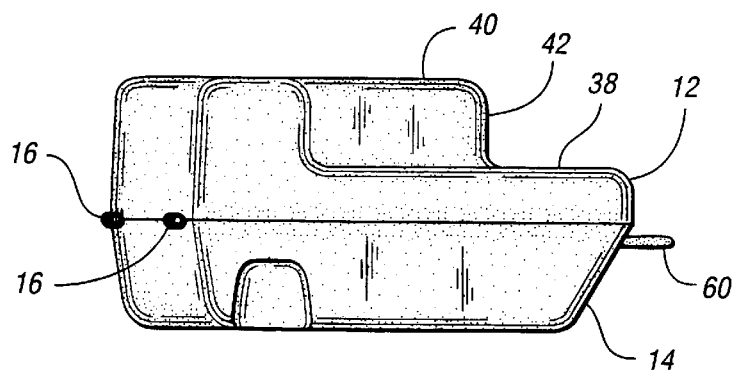
FIG. 10 is a top view of the storage container.
Figure 11:
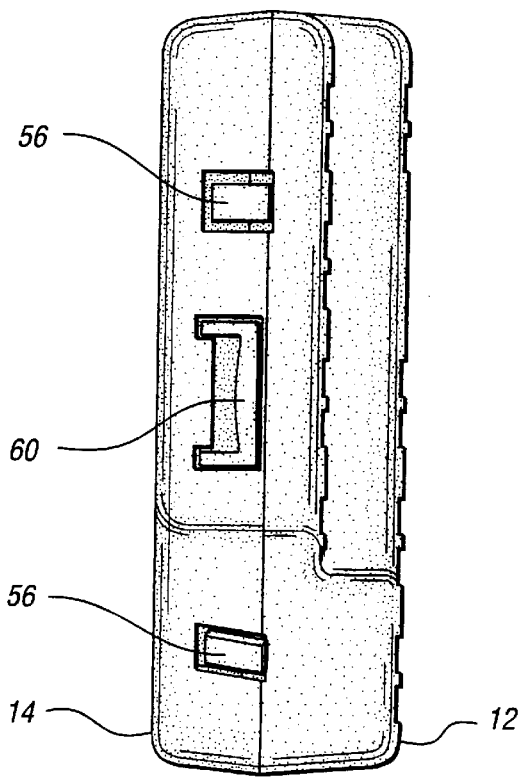
FIG. 11 is a left side view of the storage container.
Figure 12:
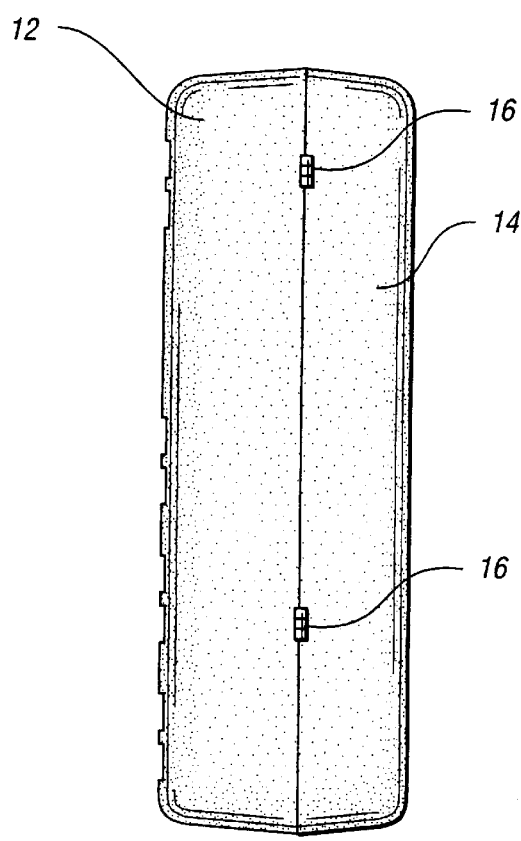
FIG. 12 is a right side view of the storage container.

FIG. 5 shows an alternative embodiment 100 of the storage container having a thin profile, as opposed to relatively thick profile shown in FIGS. 1–4. In this embodiment, the storage container 100 has the exterior surface of the first container half 112 is generally planar.

Regardless of thick or thin profile, the storage container mounts to the side wall 20 of the vehicle such that the back seat 18 can be moved forwardly and backwardly along its normal track, or folded backwardly to a fully horizontal position as shown in phantom in FIG. 1, without interference from the storage container.

It should be understood that while the forms of the invention shown and described above constitute preferred embodiments of the invention, they are not intended to illustrate all possible forms thereof. It should also be understood that the words used are words of description rather than limitation, and various changes may be made without departing from the spirit and scope of the invention disclosed.

We claim:

1. A storage container for a motor vehicle, the storage container comprising:
   a first container half;
   a second container half disposed adjacent a side wall of the vehicle;
   a hinge pivotably connecting the first container half and the second container half;
   means for removably mounting the second container half to the vehicle;
   a handle connected to the storage container for carrying the storage container when the storage container is removed from the vehicle; and
   the first container half including an intermediate portion connecting a thick portion to a thin portion of the first container half for engaging a seat belt to retain the storage container adjacent the side wall of the vehicle.

2. The storage container of claim 1 wherein the first container half has an indentation adapted to engage a projection on a floor of the vehicle.

3. The storage container of claim 1 further comprising padding disposed between the first container half and the second container half.

4. The storage container of claim 3 wherein the padding comprises foam.

5. The storage container of claim 1 wherein the means for removably mounting the second container half to the vehicle comprises at least one hole in the second container half.

6. The storage container of claim 5 wherein the at least one hole includes a generally circular portion and a slot portion.

7. The storage container of claim 1 wherein the means for removably mounting the second container half to the vehicle comprises means for removably mounting the second container half to a side wall of the vehicle.

8. The storage container of claim 1 wherein the first and second container halves comprise polyethylene.

9. The storage container of claim 1 wherein the handle is formed as part of the storage container.

10. The storage container of claim 1 wherein the thick portion defines a first plane and the thin portion defines a second plane.

11. The storage container of claim 10 wherein the first plane and the second plane are not coplanar.

12. The storage container of claim 1 wherein the first and second container halves comprise plastic.

13. The storage container of claim 12 wherein the first and second container halves are injection molded.

14. The storage container of claim 1 wherein the first and second container halves are blow molded.

15. The storage container of claim 1 wherein the first and second container halves comprise polypropylene.

\* \* \* \* \*